United States Patent [19]

McGuire et al.

[11] 4,248,611
[45] Feb. 3, 1981

[54] MINING MACHINE

[75] Inventors: Robert C. McGuire, Dublin; John J. Belcher, Jr., Columbus, both of Ohio

[73] Assignee: Dresser Industries, Inc., Dallas, Tex.

[21] Appl. No.: 37,965

[22] Filed: May 10, 1979

[51] Int. Cl.³ .......................................... B01D 47/06
[52] U.S. Cl. ............................. 55/238; 55/257 PV; 55/397; 55/229; 55/246; 299/64
[58] Field of Search ................. 55/238, 397, 257 PV, 55/246, 228, 229

[56] References Cited
U.S. PATENT DOCUMENTS

| | | |
|---|---|---|
| 1,007,289 | 10/1911 | Jeffreys . |
| 1,838,255 | 12/1931 | Handelan . |
| 1,879,107 | 9/1932 | Couch .................... 55/223 |
| 2,983,333 | 5/1961 | Percevaut . |
| 3,031,825 | 5/1962 | Fourniere ............... 55/238 |
| 3,254,475 | 6/1966 | Farr et al. . |
| 3,274,757 | 9/1966 | Wapler .................. 55/238 |
| 3,387,889 | 6/1968 | Ziemba et al. . |
| 3,389,895 | 6/1968 | De Flon ................. 261/111 |
| 3,538,688 | 11/1970 | Stanley, Jr. et al. . |
| 3,557,537 | 1/1971 | Roberts . |
| 3,792,568 | 2/1974 | Gundlach et al. ........ 299/64 |
| 4,076,315 | 2/1978 | Gundlach et al. ........ 299/64 |

FOREIGN PATENT DOCUMENTS

| | | | |
|---|---|---|---|
| 2332789 | 6/1977 | France ...................... 55/238 |
| 2350868 | 12/1977 | France ...................... 55/238 |
| 386080 | 1/1933 | United Kingdom ............ 55/397 |

Primary Examiner—Tim R. Miles
Attorney, Agent, or Firm—John M. Lorenzen; Paul E. Krieger

[57] ABSTRACT

An improved mining machine including apparatus for cleaning particle-laden gas, of the type which includes a duct in which liquid droplets are introduced into particle-laden gas flowing through the duct, a demister in the duct for removing liquid and particles from gas which moves through the duct. The improvement includes at least one curved flow path in the demister for causing the gas to change direction and a liquid collection surface defining the bottom of the demister. Collected liquid is removed from the liquid collection surface. A liquid collection barrier with an aerodynamically curved upper surface is located downstream from the curved flow path and defines the downstream end of the liquid collection surface, the barrier extending the width of the flow path. A boundary surface is spaced above the collection surface and below the uppermost portion of the barrier and extending the width of the duct through the curved flow path for forming upper and lower sections and separating removed liquid and flowing gas, the boundary surface including a plurality of openings for communicating the upper and lower portions so that liquid can gravitate to or move toward the lower portion and gas can flow through the upper portion with minimal re-entrainment of liquid.

12 Claims, 12 Drawing Figures

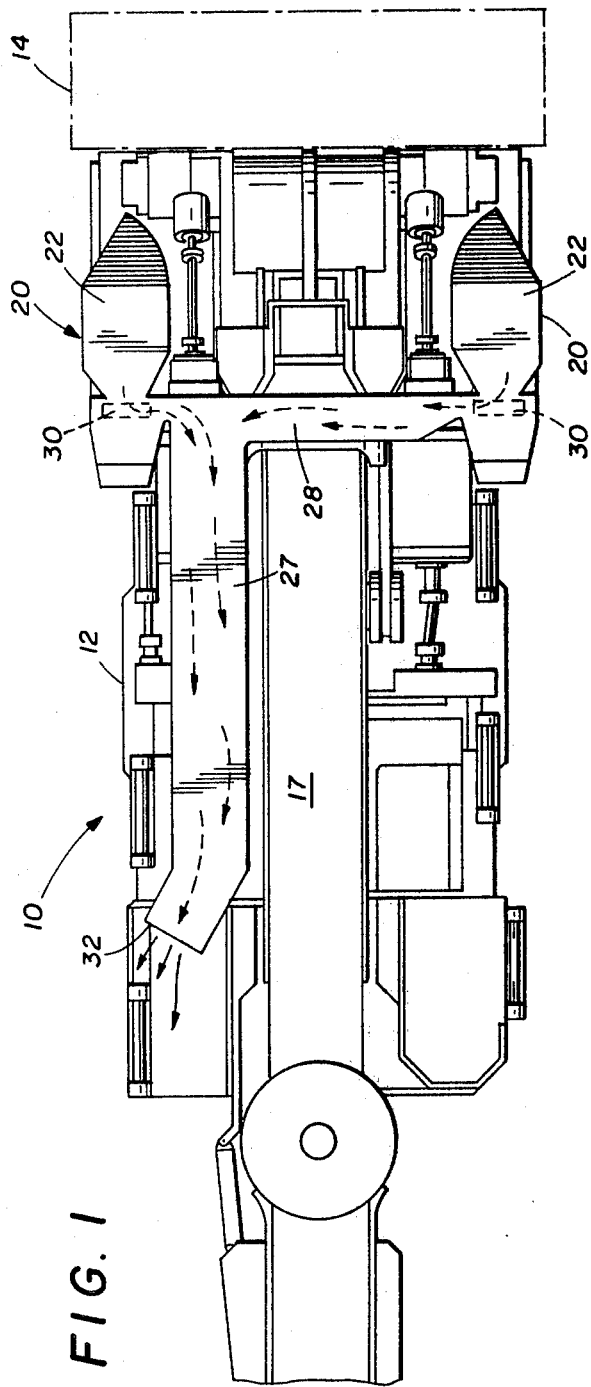
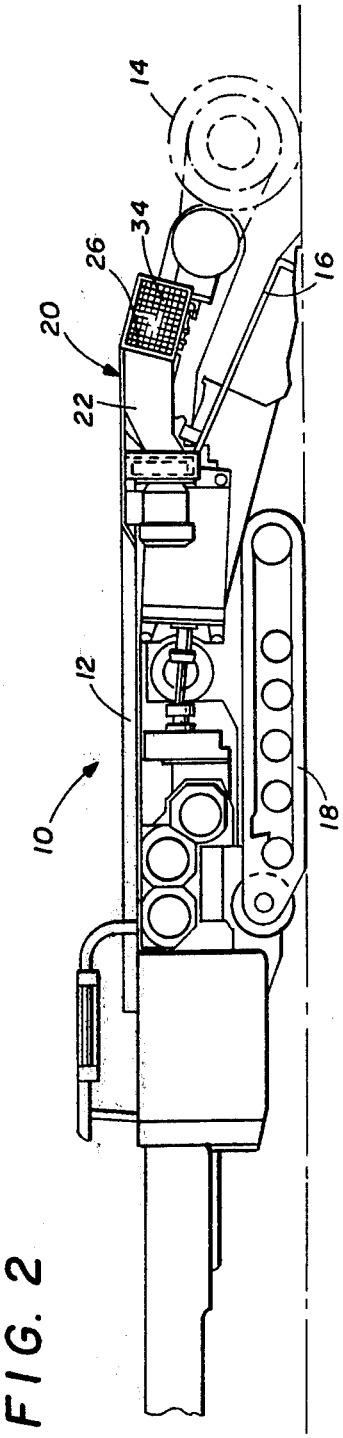
FIG. 1
FIG. 2

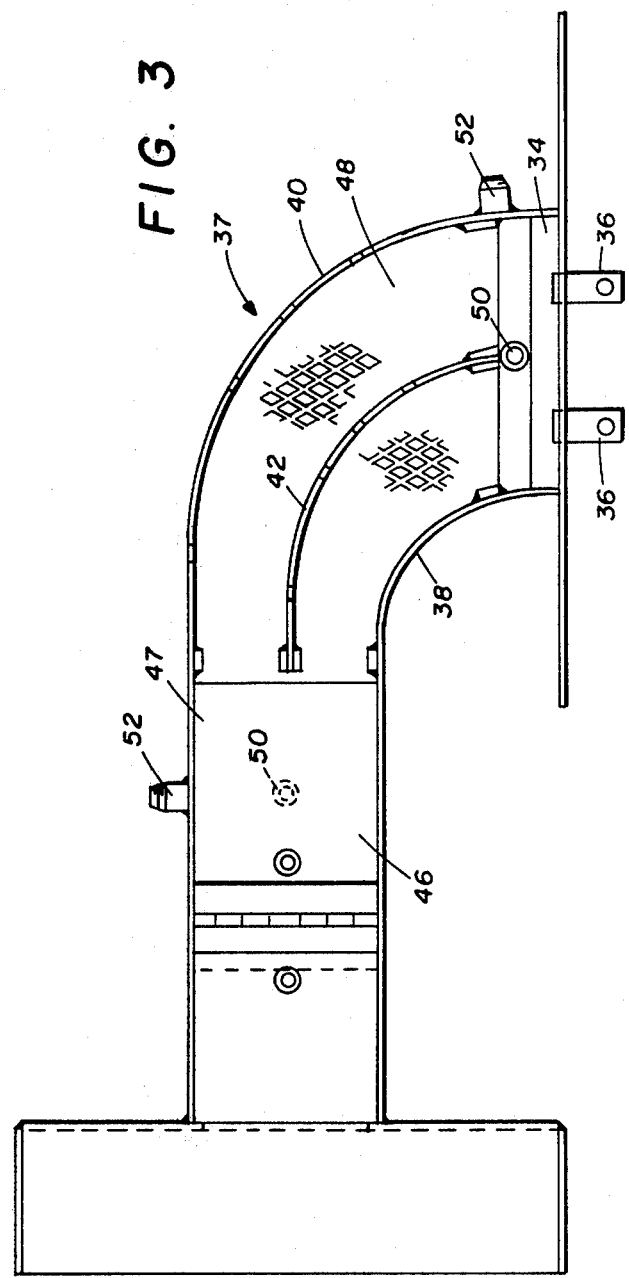
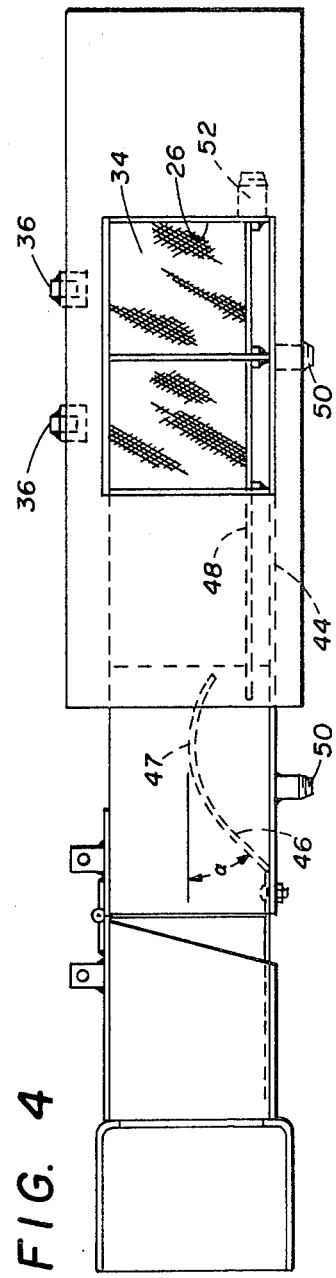

MINING MACHINE

BACKGROUND OF THE INVENTION

This invention relates to the removal of moisture and dust particles from air and, more particularly, to an apparatus which can be mounted on an underground coal mining machine for removing coal dust from the surrounding environment during mining operations.

This invention relates generally to the subject matter of co-pending U.S. patent applications, Ser. No. 950,548 filed Oct. 12, 1978, and Ser. No. 950,549 filed Oct. 12, 1978 (both of which are owned by the same entity which owns the instant invention), and represents an improvement over those inventions. This invention is also related to the subject matter of two U.S. patent applications filed on the same day herewith and owned by the same entity which owns the instant application, Ser. Nos. 037,962 and 037,963, filed May 10, 1979, and entitled, "Aerodynamic Sump Divider for Demister Unit" and "Sump Divider for Demister Unit", respectively. The subject matter of all of these applications is incorporated herein by reference for additional background information.

In underground coal mines, for example, continuous mining machines are used which generate large quantities of fine coal dust which must be removed from the air to reduce respirable dust levels to government specified limits. Relatively low dust levels are also critical for minimizing the possibility of a coal mine explosion.

The subject matter of the applications identified above represent significant advances in the art. By way of background, in air cleaning systems of this type moisture is introduced into flowing dirty air for encapsulating dirt particles. The flow path includes a demister unit which forces the air to change direction, causing the moisture and dust particles to be deflected from their normal flow path. This helps the moisture and dirt particles more easily to gravitate to a sump where they are removed from the flowing air stream.

In the two earlier-filed applications identified above, the sump is formed in part by a lower duct surface where the dirt-laden moisture collects and is removed. The sump portion can be formed several ways. In one, a slurry accumulating section is provided adjacent the rearward end of the lower collecting surface with a forwardly facing entrance for admitting moisture droplets and dust particles. Another is used in conjunction with a plurality of air guiding louvers, where an accumulating section located at the rear end of the collecting surface extends above the lower ends of the louvers. In yet another, gas inlet and outlet openings to the demister section have lower levels, the distance from the lower level of the inlet opening to the collecting surface being less than a comparable distance for the outlet opening.

Although these and the other designs disclosed in those two earlier-filed applications provide significant advantages over the prior art such as, for example, enabling a demister to be fabricated with a lower height, increasing operational efficiency, allowing noisy fans to be further removed from the operator, and providing a unit which can be retrofitted on existing mining machines, several drawbacks still exist.

For example, when the apparatus is mounted on a cutter arm of a continuous mining machine and subjected to continual up and down movement, liquid on the collecting surface tends to splash about and becomes re-entrained in the flowing air stream. The liquid also tends to surge from front to back and vice-versa which impedes even and continuous removal from the collecting surface.

Further, when a sump portion is formed with a liquid accumulation barrier adjacent the rear end of the lower collection surface and an entrance facing upstream is formed by using a plate which is connected at the top edge of the barrier and projects in the upstream direction, turbulence caused by air flowing over the plate contributes to liquid in the sump becoming re-entrained in the gas stream and significantly affects operational efficiency by impeding smooth air flow.

SUMMARY OF THE INVENTION

These problems have been overcome by the invention described in detail below. In sum, a barrier layer is provided between the flowing air stream and liquid which has accumulated on the collecting surface, which operates to form two separate regions but which at the same time allows for easy communication between them so that the dirt-encapsulated moisture droplets can easily gravitate into the lower region or sump for removal. In addition, the uppermost surface of the barrier is curved to provide an aerodynamically more efficient shape for reducing turbulence to a minimum. The smooth air flow increases flow rate and substantially eliminates splashing in the sump caused by air turbulence.

As with prior art devices, the apparatus includes a duct and means for introducing liquid into dirty air flowing through the duct so that dirt particles will become encapsulated in moisture droplets. A demister is provided downstream for removing the moisture and dirt particles. Air moving means such as an exhaust fan moves dirty air through the duct.

The demister includes one or more flow paths shaped to cause the dirt and moisture-laden air to change direction. The direction change assists precipitation of the dirt particles and moisture droplets so they will collect in a sump located in the lower section of the duct. The sump or lower duct portion in the demister section is defined at its lowermost side by a collection surface from which an accumulated waterdirt slurry can be removed. A collection barrier is located downstream from the portion of each flow path which causes the direction change and defines the downstream end of the collection surface, the barrier extending the width of and projecting into a portion of the flow path.

The top of the barrier projects upstream to form an entrance which faces upstream for preventing slurry accumulated on the collection surface from splashing out of the sump. That top portion of the barrier is curved in the form of an aerodynamically more efficient shape for effecting smoother air flow.

The sump or slurry accumulating portion of the demister and the air flow portion are separated by a boundary surface which is located above the collection surface and below the upstream edge of the entrance. The boundary surface extends the width of the duct throughout the air flow path and includes a plurality of openings so that although the duct is physically separated into two regions to allow air to flow through the upper region with minimal re-entrainment of the liquid in the lower region or sump, dust particles and moisture droplets will easily gravitate into the sump.

The division of the duct into separate air flow and slurry accumulation regions reduces re-entrainment problems when the apparatus is mounted on the movable arm of a continuous miner. Front to back surging in the sump is reduced so that the slurry will evenly flow through drains in the sump bottom.

The curved upper barrier surface provides smoother air flow which allows greater flow capacities with a shorter duct height, important features where as much air as possible must be cleaned within critical space requirements. Lower turbulence in the sump region will also reduce the tendency toward re-entrainment of moisture already collected in the sump.

BRIEF DESCRIPTION OF THE DRAWINGS

These and other objects of the invention will become apparent from the following detailed description of preferred embodiments when taken in conjunction with the accompanying drawings in which:

FIG. 1 is a top plan view with the top surface removed of a mining machine on which an air cleaning apparatus generally in accordance with the invention is mounted;

FIG. 2 is a side plan view of the continuous mining machine and apparatus of FIG. 1;

FIG. 3 is a top plan view with the top removed of one embodiment of a demister portion of an air cleaning apparatus of the type shown in FIGS. 1 and 2;

FIG. 4 is a side plan view of the apparatus shown in FIG. 3;

DETAILED DESCRIPTION OF PREFERRED EMBODIMENTS

Figure 5:
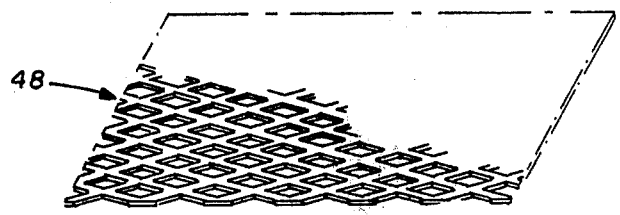
FIG. 5 is a perspective view of one embodiment of a boundary surface for separating the demister into air flow and sump regions.

Referring to FIGS. 1 and 2, a continuous mining machine 10 is shown upon which a dust control apparatus of the present invention is mounted. Since such a machine 10 is well known to those of ordinary skill in the art, a detailed description will not be presented. In general, the machine 10 has a main body 12 which carries a rotary cutter 14 at the front which is advanced against a mine face and moved up and down while rotating to remove material from the mine face (not shown). A pair of material gathering mechanisms 16 transfer the mined material to a discharge conveyor 17 which extends rearwardly from the cutter 14 for carrying material removed by the cutter to another conveyor or shuttle car (not shown). Powered tracks 18 are mounted on both sides of the body 12 for propelling the machine.

Dust particles generated during such mining operations are removed from the air by a dust control apparatus generally designated by reference numeral 20, as shown in FIGS. 1 and 2, which is mounted on arms which support and move the cutter 14. The apparatus 20 includes a pair of inlet ducts 22 each of which includes an inlet opening 26 located near the front of the mining machine 10. The inlet ducts 22 communicate with a common transfer and exhaust duct 27 through a lateral connecting duct 28. An electrically driven exhaust fan 30 (shown schematically in FIGS. 1 and 2) is mounted at the outlet end of each of the inlet ducts 22 and functions to suck dust-laden air through the inlet openings 26.

In general, the dirty air flows through a scrubber apparatus where water is sprayed into the flowing air stream and then through a demister portion where the water and dust in the air are removed, as described in greater detail below. The cleaned and dried air then flows through the transfer and exhaust duct 27 and is discharged through a discharge opening 32.

The scrubber portion of the apparatus can be located at the inlets 26 (as shown in FIGS. 1 and 2). The scrubber can be in the form of a screen 34 located in the inlet openings 26 and sprayed with water from a plurality of spray nozzles 36. The water will function to precipitate out some of the dust particles and entrain others within the water droplets which pass through the screen and will be removed downstream. Such scrubbing devices are commercially available and examples of them are shown and described in U.S. Pat. Nos. 3,792,568 and 4,076,315.

In accordance with the invention, the demister portion of each inlet duct 22 includes a section 37 which is designed to cause the moisture and dirt-laden air to change direction. In the embodiment shown in FIGS. 3 and 4, this directional change results from two curved flow paths which are formed between curved inner and outer walls 38 and 40, respectively, and a curved vane 42 located between the walls. This configuration causes the flowing air to deflect off of the vane 42 and outer wall 40 slowing the moisture and dust and accelerating its gravitation toward the lower region of the duct 22 which is defined on its lower boundary by a collecting surface 44 and which will be referred to as a sump.

Figure 9:
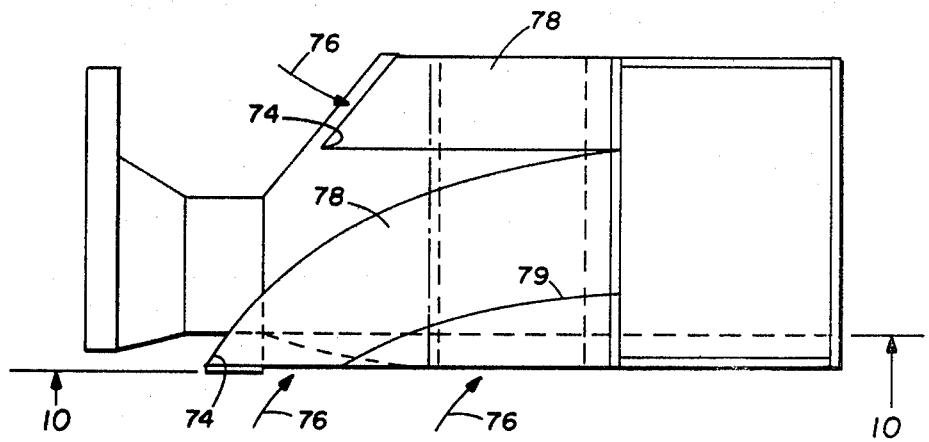
FIG. 9 is a top plan view of a third embodiment of the invention where dirty air enters at the top of an air cleaning apparatus.
Figure 10:
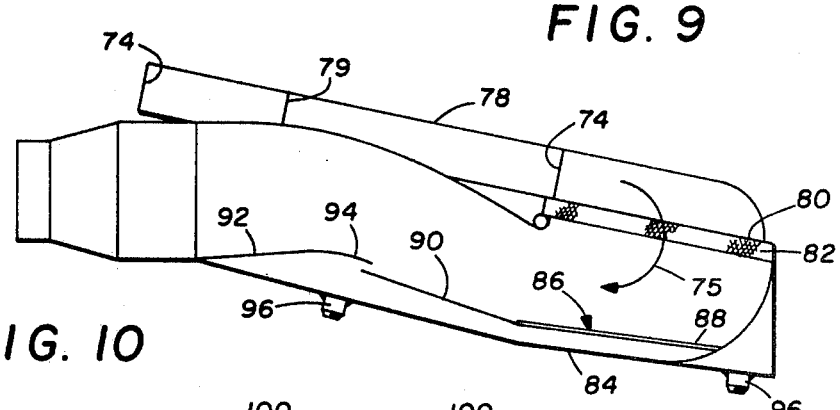
FIG. 10 is a side plan view, partially in cross-section, of the embodiment of FIG. 9, looking along the line 10—10 which shows a cross-section of the lower portion of the apparatus.

The curved duct portion can be a single flow path, such as in the embodiment shown in FIGS. 9 and 10, or as an alternative to the two or more flow path sections in the embodiments shown in FIGS. 3, 4, 7 and 8. The flow paths should be at least 3-4" wide for easy cleaning.

A collection barrier 46 projects into the flow path to define the downstream end of the sump and is located downstream from the portion of the flow path which causes the direction change. As shown in FIG. 4, an aerodynamically curved barrier extension 47 forms the upper end of the barrier 46 and defines an upstream-facing entrance for separating slurry collected in the sump from air flow. The barrier 46 in this embodiment is oriented relative to the collection surface 44 at an angle $\alpha$ which is 15° or less. The curved shape will reduce turbulence which results in greater flow efficiency and less entrainment of collected moisture back into the flowing gas.

The upstream edge of the extension 47, for some designs, can optimally be located at a height of about 28% of the total duct height. However, this will change depending on apparatus dimensions and shape.

As shown best in FIG. 4, a boundary surface 48 is spaced apart from the collecting surface 44 and below and preferably overlapping the upstream edge of the extension 47 for separating the portion of the duct 22 upstream from the extension 47 into two regions: (1) an upper air flow region and (2) a lower sump region in which liquid and dust are collected as a slurry. The boundary surface 48 functions to provide a physical separation between the two regions and at the same time provide open communication between them so that the moisture and dust can gravitate downwardly uninhibited and easily enter the sump. As shown in FIG. 3, the boundary surface 48 can extend from the inlet opening 26, through the curved portion of the duct 22, to the vicinity of the upstream end of the extension 47 across at least most of the duct width.

Figure 6:
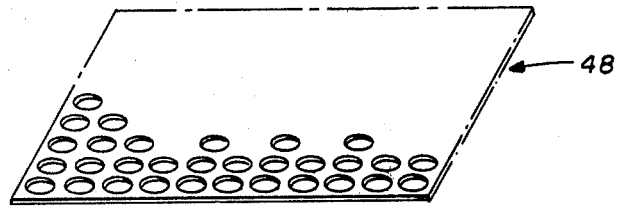
FIG. 6 is a perspective view of another embodiment of a boundary surface configuration.

The boundary surface 48 can be formed of any number of configurations which provide both the physical separation and communication between the two regions. For example, as shown in FIG. 5, a metal grid with a number of diamond-shaped openings known as "expanded metal" could be used. For expanded metal, the longer dimension of the diamonds should be oriented in the direction of air flow through the opening 26 as shown in FIG. 3. This provides better water transfer into the sump near the opening. Alternatively, as shown in FIG. 6, a metal or plastic plate with a plurality of circular openings could also be used.

When this type of apparatus is mounted on the cutting arm of a continuous mining machine, as shown in FIGS. 1 and 2, liquid located in the sump will tend to surge from front to rear in response to the up and down movement of the cutting head. The boundary surface 48 will tend to minimize these surges and prevent air flowing above the surface from contacting slurry accumulated in the sump.

Slurry is removed from the sump through discharge openings 50 located in both the front and rear portions of the collecting surface 44. Other openings 52 can be located along the outer wall 40 as shown in FIG. 3. The openings 50 and 52 can be connected to an appropriate pump or gravity discharge could be utilized. Minimizing surging of the slurry will also advantageously tend to even out slurry discharge through the openings 50 and 52.

The test unit shown in FIGS. 3 and 4 has been found to work efficiently (e.g. remove moisture at an "A" rating which means that there is no noticeable water discharging from the fan or any cold spots at the fan discharge) at flow velocities approaching 5500 ft./min. The demister duct 22 is about 6" high. Each curved flow path is about 3¼" wide at its downstream end and about 5" wide at its upstream end, the inner wall 38, vane 42 and outer wall 40 having radii of curvature of 5", 8-5/16" and 11⅜", respectively. The curved barrier extension 47 has a 4" radius of curvature, a horizontal dimension of about 4½", and the front edge is about 1-11/16" above the collection surface 44, the front edge being loated about ½" downstream from the turning vane 42. The boundary surface 48 is about 1" above the collection surface 44 and is formed of commercially available "expanded metal" as shown in FIG. 5.

Figure 7:
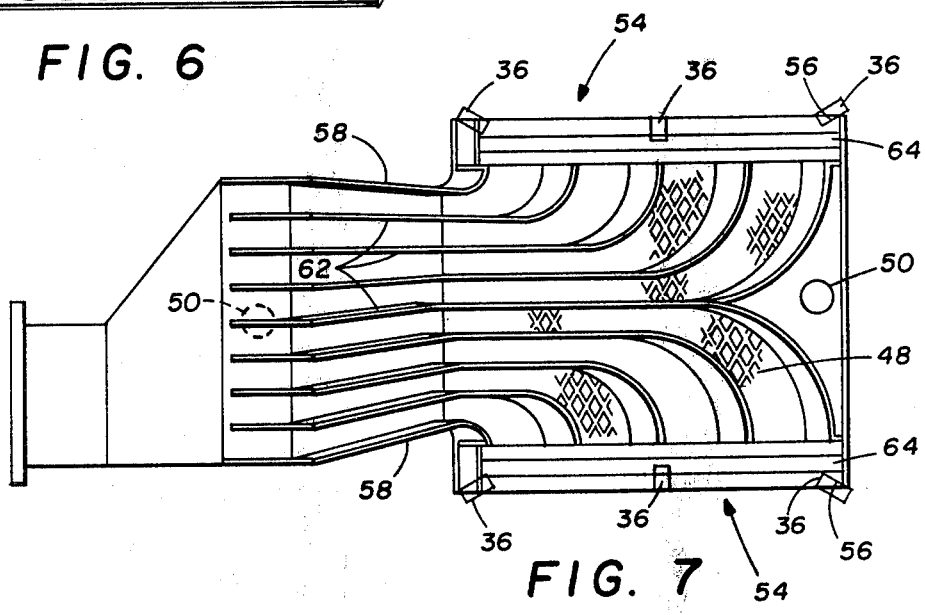
FIG. 7 is a top plan view with the top removed of another embodiment of a demister portion of an air cleaning apparatus.
Figure 8:
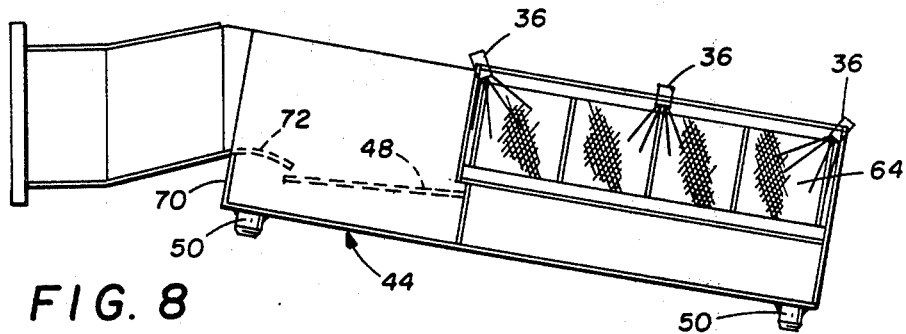
FIG. 8 is a side plan view of the apparatus shown in FIG. 7.

When units such as those shown in FIGS. 3 and 4 are mounted on a mining machine, they can be provided with inlet openings facing different directions for maximum dust collection. One alternative is to place one unit over another (not shown) with their respective inlet openings facing in different directions. Another alternative is to combine two units into a single housing such as shown in FIG. 7 where two side-by-side units 54 are located on the same level. As shown, each of the units has an inlet opening 56 leading to a curved duct portion defined by an outer wall 58 and a common inner wall 60. Between the outer and inner walls are a plurality of turning vanes 62 for forming curved flow paths within the ducts. A scrubber screen 64 is positioned in the inlet openings 56, similar to the one described above. As shown best in FIG. 8, the duct is divided into upper air flow and lower sump regions which are separated by a boundary surface 48. The bottom of the sump is defined by a collecting surface 44, the downstream end of which is defined by a collection barrier 70 which projects upwardly into the flow path. The barrier 70 can include an extension 72 connected to its upper end projecting upstream defining an upstream entrance for preventing liquid in the lower sump region from escaping, the extension 72 having a curved aerodynamically-shaped configuration similar to one described above.

Another embodiment of the invention is shown in FIGS. 9 and 10 where dirty air flows into the top of the unit and the curved flow path is disposed vertically and causes the air to change direction and flow along a path generally parallel to the incoming air but in the opposite direction, as shown by arrow 75 in FIG. 10. Dirty air flows through inlet openings 74 in the direction of arrows 76 into inlet ducts 78. One or both of the ducts can include a vane 79 for promoting more uniform air flow.

The inlet to the dust cleaning apparatus is designated generally by reference numeral 80 in which a scrubber 82 and associated water nozzles (not shown) are located which are similar in design and function to those described above.

A collection surface 84 defines the lower surface of the sump, the upper boundary being defined by a boundary surface 86 which separates the ducts into two regions, as described above, but allows water and dust particles easily to gravitate into the sump. In this embodiment the upstream portion 88 of the boundary surface 86 is formed of expanded metal (see FIG. 5) which is covered by a relatively fine mesh screen for preventing flowing air from passing through the boundary surface. The downstream portion 90 can be formed of a solid plate since a sufficient amount of moisture and dust will have been removed upstream.

The downstream end of the sump is defined by a barrier 92 and curved extension 94 similar to those described in detail above. Outlet openings 96 are provided in the collection surface 84 for removing slurry from the sump.

Figure 11:
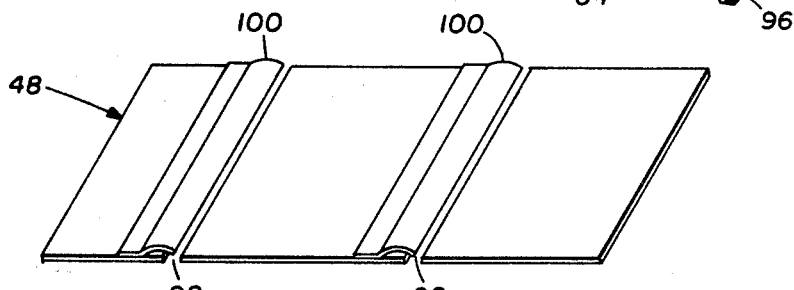
FIG. 11 is a perspective view of another embodiment of the boundary surface.

As an alternative to the boundary surface configuration 86 shown in FIG. 10, the upstream portion 88 could be formed of a mesh screen similar to that used in the scrubber 82. Further, instead of dividing the boundary surface into separate portions as shown in FIG. 10, the boundary surface could be formed as shown in FIG. 11 where a single plate with a plurality of parallel slots 98 extend perpendicular to the gas flow path and substantially the full width of the unit. A curved finger 100 is formed on the downstream side of each slot 98 and projects upstream to form upstream facing openings with aerodynamically efficient flow surfaces which divert moisture and dust through the slots 98 and into the sump.

Figure 12:
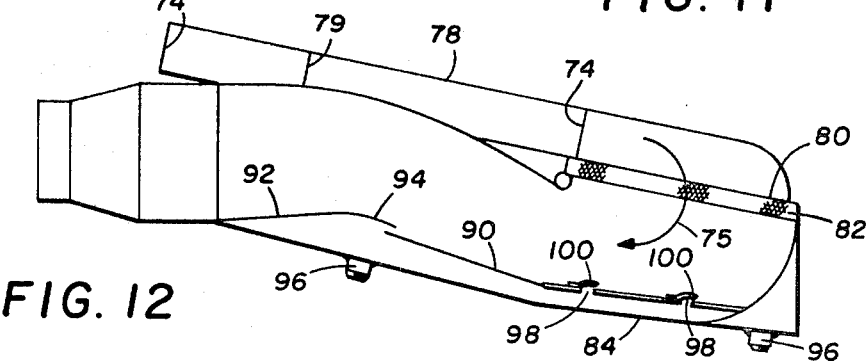
FIG. 12 is a partial cross-section of the boundary surface of FIG. 11.

When this type of boundary surface is used, the barrier 92 and boundary surface 86 could be formed as a unitary surface with the finger 100 farthest downstream performing the function of the curved barrier extension 94 as being the uppermost portion of the barrier 92 projecting above the boundary surface 86, the finger being shown in detail in FIG. 12.

It should be understood that those with ordinary skill in the art will be able to make modifications and improvements within the spirit and scope of the invention and that they are contemplated as being embraced by the appended claims.

The embodiments of the invention in which an exclusive property or privilege is claimed are defined as follows:

1. An improved apparatus for use on an underground mining machine for cleaning particle-laden gas, comprising:
    a duct mounted on the mining machine having an inlet and an outlet;
    means for pulling particle-laden gas into the duct and moving it therethrough to the outlet;
    a screen disposed in the duct proximate the inlet and adapted to permit the passage downstream of some water droplets having entrained dust particles therein;
    means for spraying liquid droplets into the inflowing particle-laden gas just before the gas enters the screen; and
    a demister for separating out the liquid droplets and particles from the wetted gas stream, comprising:
        (a) flow path means forming at least one curved flow path for causing the wetted gas to change direction;
        (b) a liquid collection surface defining the bottom of the demister;
        (c) removing means for removing the liquid from the collection surface;
        (d) a liquid collection barrier downstream from the curved flow path and defining the downstream end of the liquid collection surface, the barrier extending the width of the flow path; and
        (e) a boundary surface spaced above the collection surface and below the uppermost portion of the barrier and extending across at least a greater portion of the width of the duct through the curved flow path for forming upper and lower sections and separating removed liquid and flowing gas, the boundary surface including a plurality of openings for communicating the upper and lower portions so that liquid can gravitate to the lower portion and gas can flow through the upper portion with minimal re-intrainment of liquid.

2. The improvement of claim 1, wherein the curved flow path is horizontally disposed.

3. The improvement of claim 1, wherein the curved flow path is vertically disposed.

4. The improvement of claim 1, wherein the barrier includes a first portion perpendicular to the collection surface, the upper curved portion connected at the upper end of the first portion and projecting upstream.

5. The improvement of claim 1, wherein the barrier includes a first portion disposed at an acute angle relative to the collection surface in the upstream direction and the upper curved portion is an extension of the first portion.

6. The improvement of claims 4 or 5, wherein the upstream edge of the curved barrier portion overlaps the boundary surface and forms an opening between them.

7. The improvement of claim 1, wherein the boundary surface includes a plate with a plurality of circular openings.

8. The improvement of claim 1, wherein the boundary surface includes an expanded metal plate with a plurality of diamond-shaped openings.

9. The improvement of claims 7 or 8, wherein the boundary surface includes an upstream section with said openings and a downstream section with no openings.

10. The improvement of claim 1, wherein the boundary surface includes a plurality of parallel slots extending substantially across the width of the duct and an upstream projecting finger overlapping each slot.

11. The improvement of claim 10, wherein the barrier and boundary surface are joined to form a unitary surface, one of said fingers forming the uppermost portion of the barrier projecting above the boundary surface.

12. The improvement of claim 9, wherein a screen with a mesh smaller than the openings is disposed over the upstream section.

* * * * *